United States Patent
Bradfield

(10) Patent No.: US 8,138,649 B2
(45) Date of Patent: Mar. 20, 2012

(54) MAGNET SUPPORT AND RETENTION SYSTEM FOR HYBRID ROTORS

(75) Inventor: Michael D. Bradfield, Anderson, IN (US)

(73) Assignee: Remy Technologies, L.L.C., Anderson, IN (US)

( * ) Notice: Subject to any disclaimer, the term of this patent is extended or adjusted under 35 U.S.C. 154(b) by 472 days.

(21) Appl. No.: 11/832,949

(22) Filed: Aug. 2, 2007

(65) Prior Publication Data
US 2009/0033167 A1 Feb. 5, 2009

(51) Int. Cl.
*H02K 21/12* (2006.01)

(52) U.S. Cl. ......... 310/156.19; 310/156.08; 310/156.23; 310/156.16

(58) Field of Classification Search ............. 310/156.19, 310/156.08, 156.23, 156.16
See application file for complete search history.

(56) References Cited

U.S. PATENT DOCUMENTS

| | | | | |
|---|---|---|---|---|
| 4,354,126 A * | 10/1982 | Yates | ................ | 310/156.59 |
| 4,683,393 A * | 7/1987 | Stokes | ................ | 310/156.13 |
| 5,777,415 A * | 7/1998 | Suzuki et al. | ................ | 310/156.05 |
| 5,796,190 A * | 8/1998 | Takeda et al. | ................ | 310/58 |
| 5,857,762 A * | 1/1999 | Schwaller | ................ | 362/473 |
| 6,013,963 A * | 1/2000 | Shelton, Jr. | ................ | 310/179 |
| 6,376,956 B1 * | 4/2002 | Hosoya | ................ | 310/154.17 |
| 6,509,664 B2 * | 1/2003 | Shah et al. | ................ | 310/181 |
| 6,845,617 B1 * | 1/2005 | Allen et al. | ................ | 60/607 |
| 2004/0113505 A1 * | 6/2004 | Haydock et al. | ................ | 310/156.19 |
| 2004/0155546 A1 * | 8/2004 | Stevens et al. | ................ | 310/156.01 |
| 2005/0206262 A1 * | 9/2005 | Kim et al. | ................ | 310/156.43 |
| 2006/0028083 A1 * | 2/2006 | Costin et al. | ................ | 310/156.55 |
| 2006/0038457 A1 * | 2/2006 | Miyata | ................ | 310/156.45 |
| 2006/0220483 A1 * | 10/2006 | Jones et al. | ................ | 310/156.19 |
| 2006/0255679 A1 * | 11/2006 | Dine et al. | ................ | 310/156.55 |

FOREIGN PATENT DOCUMENTS

| EP | 459355 A | * 12/1991 |
|---|---|---|
| JP | 04133637 A | * 5/1992 |

* cited by examiner

*Primary Examiner* — Quyen Leung
*Assistant Examiner* — Alex W Mok
(74) *Attorney, Agent, or Firm* — Cantor Colburn LLP

(57) ABSTRACT

Disclosed is a rotor assembly for an electric machine includes a rotor core. The rotor core has at least one magnet slot with an increasing slot width as radial distance from a rotor shaft increases, and at least one slot lip extending at least partially across the slot width. The rotor assembly also includes at least one permanent magnet located in at least one magnet slot, the magnet having an increasing magnet width as radial distance from a rotor shaft increases. The rotor assembly further includes a retainer disposed in the magnet slot radially between the magnet and the at least one slot lip. Also disclosed is a method of securing at least one permanent magnet in a rotor assembly of an electric machine.

19 Claims, 3 Drawing Sheets

MAGNET SUPPORT AND RETENTION SYSTEM FOR HYBRID ROTORS

BACKGROUND OF THE INVENTION

This disclosure relates generally to electric machines. More specifically, this disclosure relates to support and retention of rotor magnets in electric machines.

Rotors of electric machines typically include permanent magnets inserted between pole pieces of the rotor. The magnets, typically rectangular in cross-section, are placed into aluminum packets and inserted into rectangular slots between the pole pieces. Because of the rectangular cross-sections of the magnets and the slots, air gaps exist between the magnets and the slots thereby reducing the magnetic effectiveness of the rotor. During operation of the electric machine, the rotor magnets are subjected to centrifugal forces which force the magnets radially outward and to impact an outer lip of the pole pieces, causing damage to the magnet material.

SUMMARY OF THE INVENTION

A rotor assembly for an electric machine includes a rotor core. The rotor core has at least one magnet slot with an increasing slot width as radial distance from a rotor shaft increases, and at least one slot lip extending at least partially across the slot width. The rotor assembly also includes at least one permanent magnet located in at least one magnet slot, the magnet having an increasing magnet width as radial distance from a rotor shaft increases. The rotor assembly further includes a retainer disposed in the magnet slot radially between the magnet and the at least one slot lip.

A method of securing at least one permanent magnet in a rotor assembly of an electric machine includes inserting at least one permanent magnet into at least one magnet slot and inserting a retainer into the magnet slot radially between the magnet and the at least one slot lip.

DESCRIPTION OF THE DRAWINGS

The above, as well as other advantages of the present invention, will become readily apparent to those skilled in the art from the following detailed description when considered in light of the accompanying drawings in which.

DETAILED DESCRIPTION OF THE INVENTION

Figure 1:
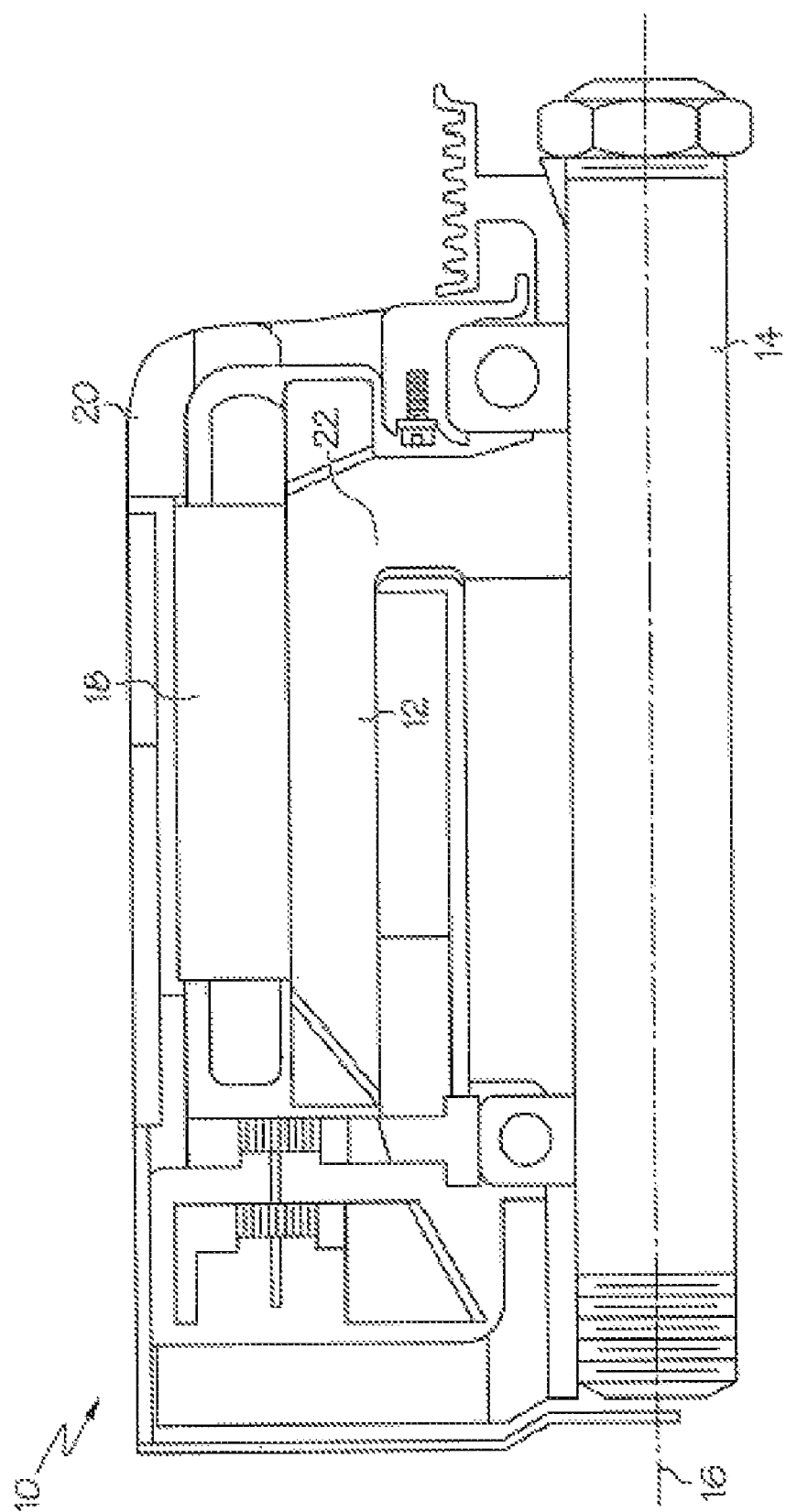
FIG. 1 is a cross-sectional view of an embodiment of an alternator.

Shown in FIG. 1 is an electric machine for a vehicle, for example, an alternator 10. The alternator 10 includes a rotor 12 which is operably connected to a shaft 14. The rotor 12 and shaft 14 are configured and disposed to rotate about a shaft axis 16. A stator 18 is disposed radially outboard of the rotor 12 and extends axially along a length of the rotor 12 and circumferentially around the rotor 12. The stator 18 and rotor 12 are disposed within a housing 20.

Figure 2:
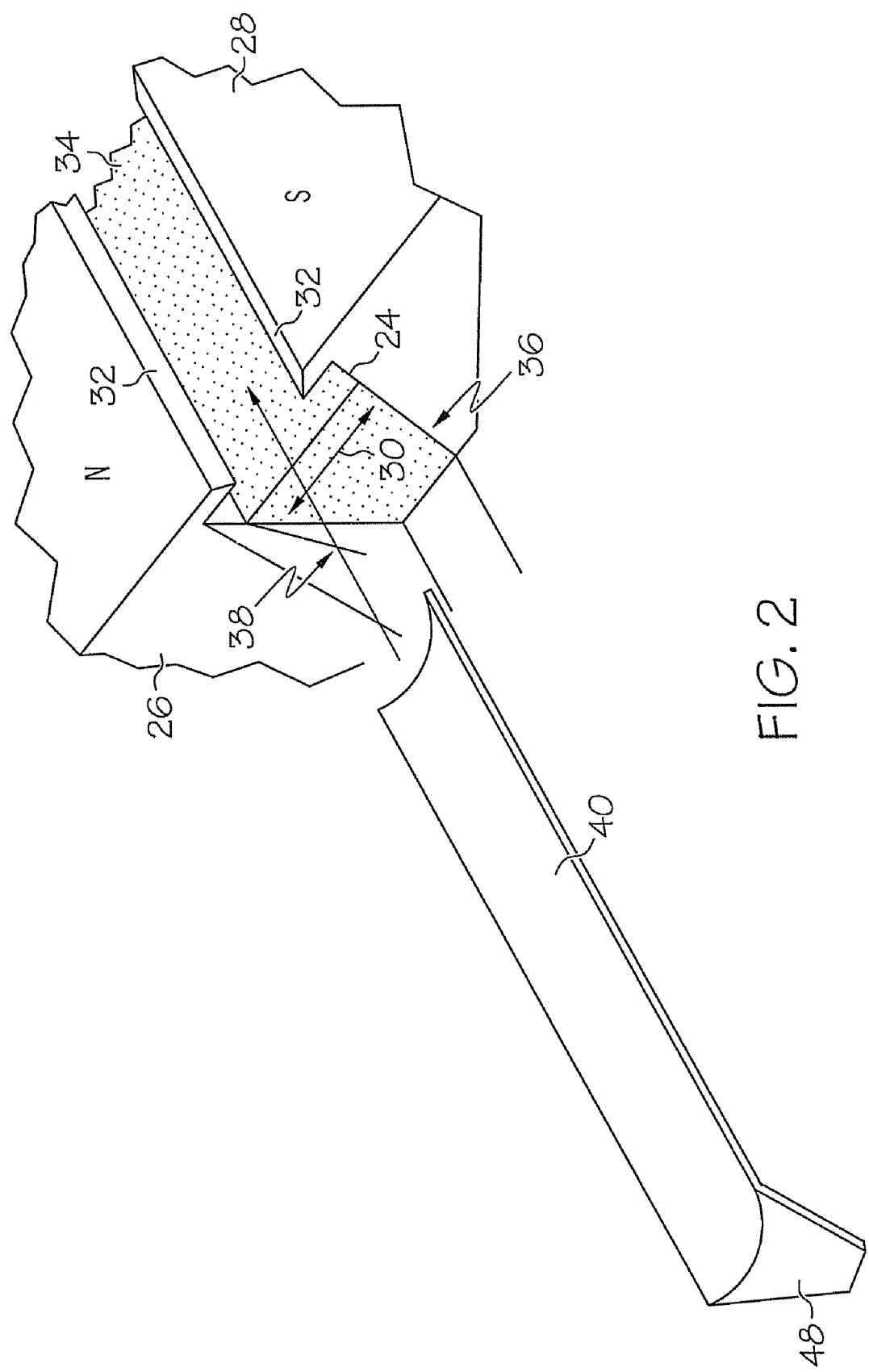
FIG. 2 is a perspective view of a rotor slot and magnet of the alternator of FIG. 1.

The rotor 12 includes a rotor core 22. The rotor core 22 is made from a magnetic material such as iron. As shown in FIG. 2, the rotor core 22 includes one or more magnet slots 24 between rotor poles 26 and 28, which are polarized "N" and "S", respectively. The slot 24 has a tapered cross-section, such that the slot width 30 increases as the slot extends radially from the shaft 14. At a radially outermost end of the rotor poles 26 and 28, a slot lip 32 extends circumferentially from at least one of the rotor poles 26 and 28 toward an opposite rotor pole 26, 28.

The rotor 12 includes one or more permanent magnets 34 disposed in each magnet slot 24. Each magnet 34 has a tapered cross section configured such that a magnet taper angle 36 of the magnet 34 is substantially equal to a slot taper angle 38 of the magnet slot 24. This configuration allows the magnet 34 to be located at varying radial positions in the magnet slot 24 and to minimize air gaps between the magnet 34 and the magnet slots 24. The magnet 34 is polarized and inserted axially into the magnet slot 24 such that an "N" polarization area of the magnet 34 is adjacent to "N" polarized rotor pole 26, and likewise an "S" polarized portion of the magnet 34 is adjacent to "S" polarized rotor pole 28.

Figure 3:
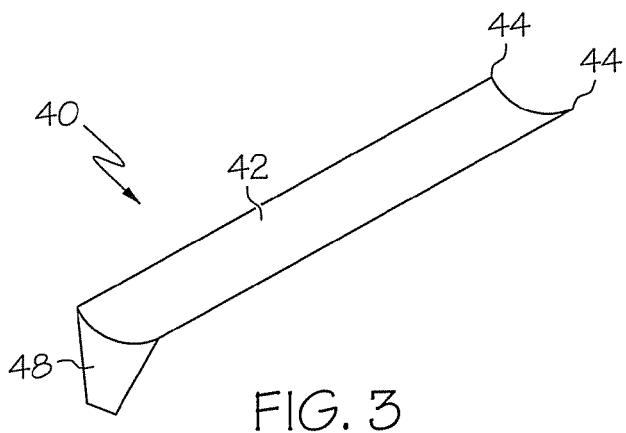
FIG. 3 is a perspective view of an example of a magnet retainer for the alternator of FIG. 1.
Figure 4:
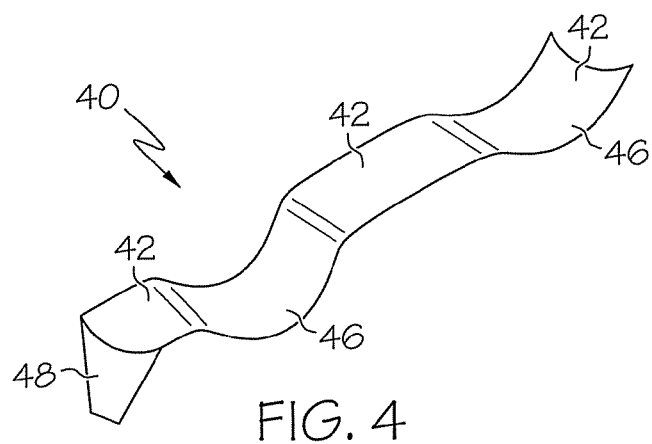
FIG. 4 is a perspective view of another example of a magnet retainer for the alternator of FIG. 1.
Figure 5:
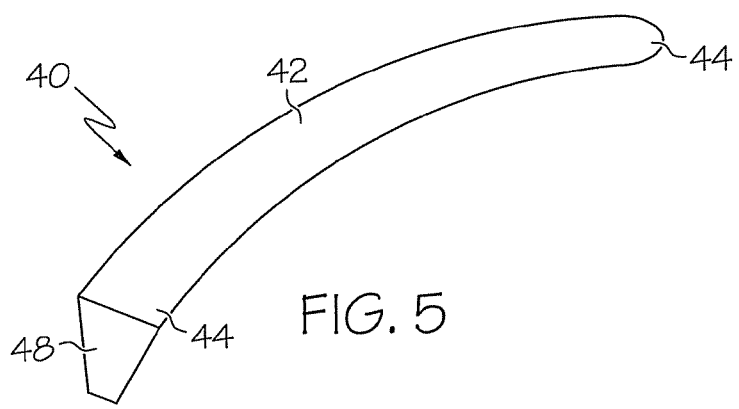
FIG. 5 is a perspective view of yet another example of a magnet retainer for the alternator of FIG. 1.

A retainer 40 is utilized to locate the magnet 34 in the magnet slot 24 in a radial direction. The retainer 40 is disposed in the magnet slot 24 radially between the magnet 34 and the slot lip 32. In some embodiments, the retainer 40 is formed from a material having low magnetic properties, for example, stainless steel, plastic, glass-filled nylon. These materials are utilized to prevent magnetic arcing between the rotor poles 26 and 28 which have opposing polarity, and thereby reducing the magnetic performance of the rotor 12. In some embodiments where maximum performance may not be necessary, the retainer 40 may be formed from a material such as a low grade carbon steel. The retainer 40 has a shape that provides a spring action between the magnet 34 and the slot lip 32. Examples of suitable retainer shapes are shown in FIGS. 3-5. The example of retainer 40 in FIG. 3 has a concave cross sectional shape. In FIG. 3, the retainer is configured such that a peak 42 contacts the magnet 34 and ends 44 contact one or more of the slot lips 32. It is to be appreciated, however, that this configuration could be inverted, meaning disposed such that the peak 42 contacts one or more of the slot lips 32 and the ends 44 contact the magnet 34. Another example of a retainer 40 is shown in FIG. 4. The example retainer 40 of FIG. 4 is substantially S-shaped or sinusoidally-shaped in the axial direction. The retainer 40 is configured such that one or more peals 42 contact one or more of the slot lips 32 and one or more valleys 46 contact the magnet 34. A third example of a retainer 40 is shown in FIG. 5. This retainer 40 is a single arc in the axial direction. The retainer 40 of FIG. 5 is configured such that the peak 42 contacts one or more of the slot lips 32 and at least one of the ends 44 contact the magnet 34. Like the retainer 40 of FIG. 3, though, the configuration of the retainer 40 of FIG. 5 may be inverted in some embodiments. In the inverted configuration, the peak 42 contacts the magnet 34 and at least one of the ends 44 contacts one or more of the slot lips 32. It is to be appreciated that the retainer 40 shapes illustrated in FIGS. 3-5 are only examples and other retainer 40 configurations are contemplated within the current scope.

Referring again to FIG. 2, in some embodiments the retainer 40 is inserted into the magnet slot 24 by sliding it in an axial direction between the magnet 34 and the slot lips 32. The spring action of the retainer 40 forces the magnet 34 in a radially downwardly direction and secures the magnet 34 against the magnet slot 24 minimizing air gaps therebetween. The spring action of the retainer 40 allows the magnet 34 to shift radial position slightly during operation of the alternator 10 as centrifugal forces cause the slot gap 24 to shrink. Consequently, the magnet 34 is less likely to be damaged during operation.

In some embodiments, an end of the retainer 40 may be formed or bent to form an insertion tab 48. The insertion tab 48 is utilized as a surface to push when inserting the retainer 40 into the magnet slot 24. Further, non-ferrous rings or fans 50 may be fixed to one or more axial end of the rotor 12. The fans 50 are utilized to trap the magnet 34 and the retainer 40 in the magnet slot 24, and also provide material to be drilled or machined away for balancing of the rotor 12.

While embodiments of the invention have been described above, it will be understood that those skilled in the art, both now and in the future, may make various improvements and enhancements which fall within the scope of the claims which follow. These claims should be construed to maintain the proper protection for the invention first described.

What is claimed is:

1. A rotor assembly for an electric machine comprising:
a rotor core including:
at least one magnet slot, the magnet slot having an increasing slot width as radial distance from a rotor shaft increases; and
at least one slot lip extending at least partially across the slot width;
at least one permanent magnet disposed in the at least one magnet slot, the magnet having an increasing magnet width as radial distance from a rotor shaft increases; and
a retainer disposed in the at least one magnet slot radially between the magnet and the at least one slot lip, the retainer configured to urge the magnet into contact with sidewalls of the magnet slot and to allow radial movement of the magnet relative to the magnet slot during operation of the electric machine.

2. The rotor assembly of claim 1 wherein the retainer substantially spans a distance between a surface of the magnet and a surface of the at least one slot lip opposed to the surface of the magnet.

3. The rotor assembly of claim 2 wherein the retainer exerts a force on the magnet in a radially inward direction.

4. The rotor assembly of claim 1 wherein the retainer is formed from a non-ferrous material.

5. The rotor assembly of claim 4 wherein the retainer is formed from plastic.

6. The rotor assembly of claim 4 wherein the retainer is formed from glass-filled nylon.

7. The rotor assembly of claim 1 wherein the slot width is continually increasing as radial distance from the rotor shaft increases.

8. The rotor assembly of claim 7 wherein the magnet width is continually increasing as radial distance from the rotor shaft increases.

9. The rotor assembly of claim 1 wherein the retainer has a concave cross-sectional shape.

10. The rotor assembly of claim 1 wherein the retainer is substantially S-shaped in a direction along an axis of the rotor shaft.

11. The rotor assembly of claim 1 wherein the retainer is shaped as a single arc in a direction along an axis of the rotor shaft.

12. The rotor assembly of claim 1 wherein the retainer includes an insertion aid formed in one end of the retainer.

13. The rotor assembly of claim 1 further comprising one or more fans disposed at one or more axial ends of the rotor core.

14. The rotor assembly of claim 13 wherein the one or more fans are formed from a non-ferrous material.

15. A method of securing at least one permanent magnet in a rotor assembly of an electric machine comprising:
inserting at least one permanent magnet into at least one magnet slot in the rotor assembly, the magnet having an increasing magnet width as radial distance from a rotor shaft increases, the magnet slot having an increasing slot width as radial distance from the rotor shaft increases; and
inserting a retainer into the magnet slot radially between the magnet and the at least on slot lip, the retainer configured to urge the magnet into contact with sidewalls of the magnet slot and to allow radial movement of the magnet relative to the magnet slot during operation of the electric machine.

16. The method of claim 15 further comprising exerting a force on the magnet in a radially inward direction via the retainer.

17. The method of claim 15 wherein the retainer is inserted into the magnet slot in an axial direction.

18. The method of claim 17 wherein inserting the retainer into the magnet slot includes pushing an insertion aid of the retainer, thereby pushing the retainer into the magnet slot.

19. The method of claim 15 further comprising affixing one or more fans to one or more axial ends of the rotor core, the one or more fans disposed and configured to substantially maintain axial position of the at least one permanent magnet in the magnet slot.

* * * * *